(12) United States Patent
Su et al.

(10) Patent No.: US 10,936,297 B2
(45) Date of Patent: Mar. 2, 2021

(54) METHOD, DEVICE, AND COMPUTER PROGRAM PRODUCT FOR UPDATING SOFTWARE

(71) Applicant: EMC IP Holding Company LLC, Hopkinton, MA (US)

(72) Inventors: Lihui Su, Shanghai (CN); Yujun Liang, Shanghai (CN); Yubing Zhang, Shanghai (CN); Ming Zhang, Shanghai (CN); Ren Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/564,299

(22) Filed: Sep. 9, 2019

(65) Prior Publication Data

US 2021/0019136 A1    Jan. 21, 2021

(30) Foreign Application Priority Data

Jul. 19, 2019 (CN) .......................... 201910655498.8

(51) Int. Cl.
*G06F 8/65* (2018.01)
(52) U.S. Cl.
CPC ..................... *G06F 8/65* (2013.01)
(58) Field of Classification Search
CPC ............... G06F 8/65; G06F 8/61; G06F 8/656
USPC ........................ 717/168–178, 121
See application file for complete search history.

(56) References Cited

U.S. PATENT DOCUMENTS

| | | | | |
|---|---|---|---|---|
| 6,385,766 B1* | 5/2002 | Doran, Jr. | ................. | G06F 8/63 |
| | | | | 707/999.202 |
| 8,601,466 B2* | 12/2013 | Chen | ......................... | G06F 8/61 |
| | | | | 717/176 |
| 8,626,927 B2* | 1/2014 | Mazilo | .................... | H04L 67/32 |
| | | | | 709/227 |
| 9,892,013 B2* | 2/2018 | Tan | ......................... | G06F 8/658 |
| 10,353,686 B1* | 7/2019 | Pasha | ......................... | G06F 8/61 |
| 2003/0195974 A1* | 10/2003 | Ronning | ................. | H04L 67/06 |
| | | | | 709/230 |
| 2003/0233648 A1* | 12/2003 | Earl | .......................... | G06F 8/65 |
| | | | | 717/176 |
| 2009/0113334 A1* | 4/2009 | Chakra | .................... | G06F 9/451 |
| | | | | 715/772 |
| 2009/0144730 A1* | 6/2009 | Chen | ......................... | G06F 8/61 |
| | | | | 717/178 |

(Continued)

*Primary Examiner* — Marina Lee
(74) *Attorney, Agent, or Firm* — Ryan, Mason & Lewis, LLP

(57) ABSTRACT

Embodiments of the present disclosure provide a method, a device, and a computer program product for updating software. The method comprises: determining a plurality of to-be-updated components from a component set comprised in the software; updating the plurality of components; periodically acquiring a component update progress corresponding to each component of the plurality of components, the component update progress indicating a completion percentage of updating of the corresponding component; and determining a software update progress of the software based on component update progresses of the plurality of components, the software update progress indicating a completion percentage of updating of the software. In this way, more accurate software update progress information can be provided.

20 Claims, 4 Drawing Sheets

(56) References Cited

U.S. PATENT DOCUMENTS

2013/0125107 A1\* 5/2013 Bandakka ........... G06F 11/1448
717/171

\* cited by examiner

METHOD, DEVICE, AND COMPUTER PROGRAM PRODUCT FOR UPDATING SOFTWARE

RELATED APPLICATION(S)

The present application claims priority to Chinese Patent Application No. 201910655498.8, filed Jul. 19, 2019 and entitled "Method, Device, and Computer Program Product for Updating Software," which is incorporated by reference herein in its entirety.

FIELD

Embodiments of the present disclosure relate to the field of computers, and more specifically to a method, a device, and a computer program product for updating software.

BACKGROUND

With the development of computer technologies, the cycle of software update and iteration becomes shorter and shorter. Software update has become one of the operations that people need to do every day. As the scale of software becomes larger and larger, the time taken to update the software may also increase. It is expected that an accurate software update progress can be provided to understand a current software update state. Therefore, how to determine a software update progress more accurately has become a focus of attention at present.

SUMMARY

Embodiments of the present disclosure provide a scheme for updating software.

According to a first aspect of the present disclosure, a method for updating software is presented. The method includes: determining a plurality of to-be-updated components from a component set comprised in the software; updating the plurality of components; periodically acquiring a component update progress corresponding to each component of the plurality of components, the component update progress indicating a completion percentage of updating of the corresponding component; and determining a software update progress of the software based on component update progresses of the plurality of components, the software update progress indicating a completion percentage of updating of the software.

According to a second aspect of the present disclosure, a device for updating software is provided. The device includes: at least one processing unit; and at least one memory, the at least one memory being coupled to the at least one processing unit and storing instructions to be executed by the at least one processing unit, the instructions, when executed by the at least one processing unit, causing the device to execute an action, the action including: determining a plurality of to-be-updated components from a component set included in the software; updating the plurality of components; periodically acquiring a component update progress corresponding to each component of the plurality of components, the component update progress indicating a completion percentage of updating of the corresponding component; and determining a software update progress of the software based on component update progresses of the plurality of components, the software update progress indicating a completion percentage of updating of the software.

In a third aspect of the present disclosure, a computer program product is provided. The computer program product is stored in a non-transitory computer storage medium and includes machine executable instructions. The machine executable instructions, when running in a device, cause the device to execute any step of the method according to the first aspect of the present disclosure.

This Summary is provided to introduce a selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from the more detailed description of exemplary embodiments of the present disclosure provided below with reference to the accompanying drawings. In the exemplary embodiments of the present disclosure, like reference numerals generally represent like elements.

DETAILED DESCRIPTION

Preferred embodiments of the present disclosure will be described in more detail below with reference to the accompanying drawings. The preferred embodiments of the present disclosure are shown in the accompanying drawings. However, it should be understood that the present disclosure can be implemented in various forms without being limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless otherwise specifically stated, the term "or" indicates "and/or." The term "based on" indicates "based at least in part on." The terms "an exemplary embodiment" and "an embodiment" indicate "at least one exemplary embodiment." The term "another embodiment" indicates "at least one additional embodiment." The terms "first," "second," and the like may refer to different or identical objects. Other explicit and implicit definitions may be further included below.

As described above, it is expected that a current software update state can be obtained accurately. Some traditional schemes often can merely acquire an update progress of locally installed software, which is hardly applicable to a situation where a plurality of components of the software are distributedly installed. For example, when a piece of software includes a plurality of components deployed to different computing nodes, it will be difficult for the traditional schemes to accurately determine an overall update progress of the software.

According to the embodiments of the present disclosure, a scheme for updating software is provided. In the scheme, a plurality of to-be-updated components are first determined from a component set included in the software, then the plurality of components are updated, and a component update progress corresponding to each component of the plurality of components is periodically acquired, wherein the component update progress indicates a completion percentage of updating of the corresponding component. Component update progresses of the plurality of components are further used for determining a software update progress of the software, wherein the software update progress indicates a completion percentage of updating of the software. The embodiments of the present disclosure can provide a more accurate software update progress based on real-time update progresses of different components included in the software.

Figure 1:
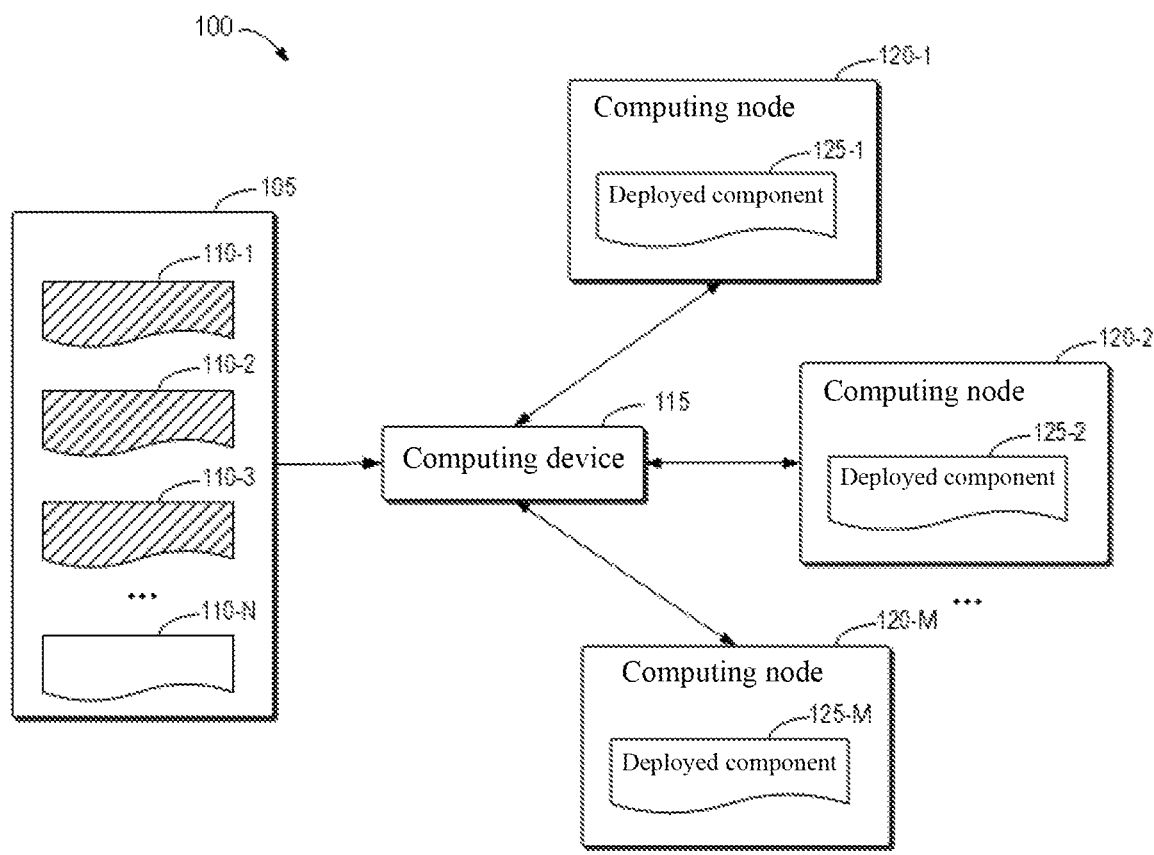
FIG. 1 illustrates a schematic diagram of an exemplary environment in which embodiments of the present disclosure may be implemented.

FIG. 1 shows a schematic diagram of an environment 100 in which embodiments of the present disclosure may be implemented. As shown in FIG. 1, the environment 100 includes a computing device 115 and one or more computing nodes 120-1, 120-2, . . . 120-M (individually or collectively referred to as computing nodes 120). Each of the computing nodes 120 may include a deployed component 125-1, 125-2, . . . 125-M (individually or collectively referred to as deployed components 125) deployed thereon. It should be understood that the computing nodes 120-1, 120-2, . . . 120-M are shown in different blocks in FIG. 1 merely to reflect possible deployment relationships among different deployed components 125. In some embodiments, different blocks may denote an identical computing node. For example, the deployed component 125-1 and the deployed component 125-2 may be deployed at the same computing node 120. In some embodiments, the computing device 115 may be integrated into one of the computing nodes 120. In some other embodiments, the computing device 115 may also be a stand-alone device different from the computing node 120.

As shown in FIG. 1, software 105 may include a component set composed of a plurality of components 110-1, 110-2, 110-3, . . . 110-N (individually or collectively referred to as components 110), wherein the deployed components 125 deployed to the computing nodes 120 may be a part of or all the components 110 included in the software.

The computing device 115 can receive an update file corresponding to the software 105, and update the deployed components 125 deployed in the computing nodes by using the update file. The computing device 115 can further acquire a component update process of each of the deployed components 125 being updated from the computing nodes 120, thereby determining a software update progress of the software 105. In this way, the embodiments of the present disclosure reduce the granularity of an update progress and thus can provide more accurate software update progress information.

Figure 2:
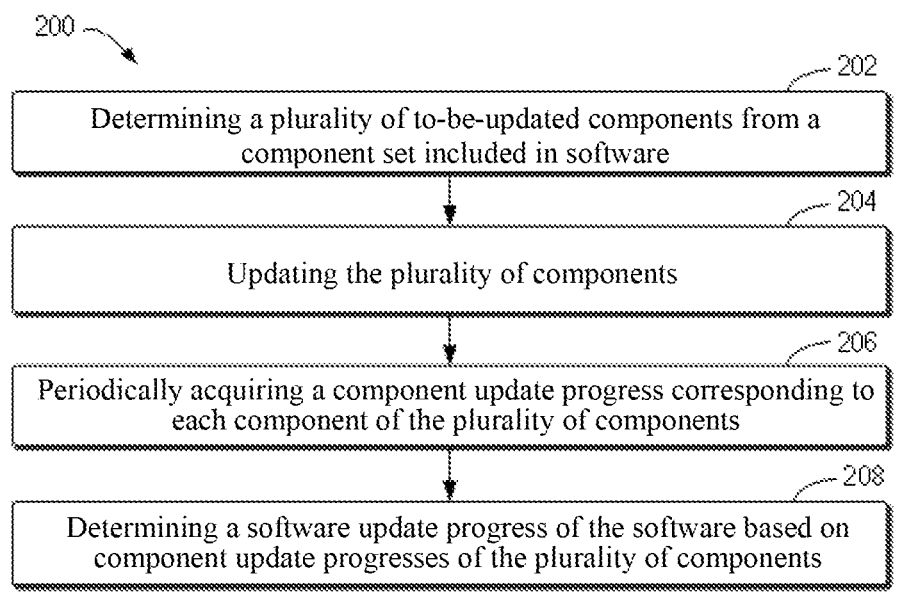
FIG. 2 illustrates a flowchart of a process of updating software according to an embodiment of the present disclosure.

A process of updating software according to an embodiment of the present disclosure will be described below with reference to FIG. 2 to FIG. 5. FIG. 2 shows a flowchart of a process 200 of updating software according to some embodiments of the present disclosure. The process 200 may be implemented by the computing device 115 in FIG. 1. To facilitate discussion, the process 200 will be described below in conjunction with FIG. 1.

In a block 202, the computing device 115 determines a plurality of to-be-updated components from a component set 110 included in the software 105. As described above, the software 105 may include a plurality of components 110, wherein a part of or all the components 110 are deployed to the computing nodes 120 for use as the deployed components 125.

Figure 3:
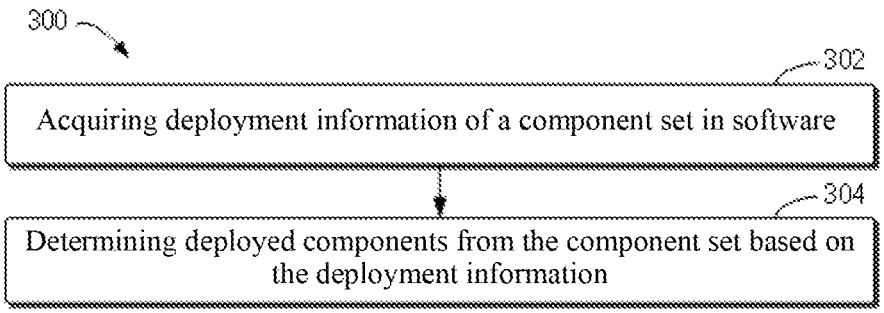
FIG. 3 illustrates a flowchart of a process of determining a plurality of to-be-updated components according to an embodiment of the present disclosure.

In some embodiments, the computing device 115 may determine a plurality of to-be-updated components based on a deployment situation of each component 110 in the component set. A specific process of the block 202 will be described below in conjunction with FIG. 3. FIG. 3 shows a flowchart of a process 300 of determining a plurality of to-be-updated components according to an embodiment of the present disclosure.

As shown in FIG. 3, in a block 302, the computing device 115 can acquire deployment information of a component set in the software 105, wherein the deployment information at least indicates whether each component 110 in the component set is deployed. In some embodiments, in a process of installing the software 105, the deployment information indicating the component set of the software 105 can be generated based on a specific deployment situation of a user. For example, in the example of FIG. 1, e.g., the component 110-1, the component 110-2, and the component 110-3 (as denoted by the hatched blocks) in the software 105 have been deployed to the computing nodes 120.

In a block 304, the computing device 115 can determine deployed components from the component set based on the deployment information. In some embodiments, the computing device 115 can acquire the deployment information, thereby determining whether each component 110 in the component set is deployed, determining deployed components (e.g., the component 110-1, the component 110-2, and the component 110-3) from the component set, and determining that the deployed components will be updated.

In some embodiments, not all deployed components need to be updated. For example, the computing device 115 can further determine whether the deployed components (e.g., the component 110-1, the component 110-2, and the component 110-3) need to be updated in this software update, and select to-be-updated components from the deployed components.

Figure 4:
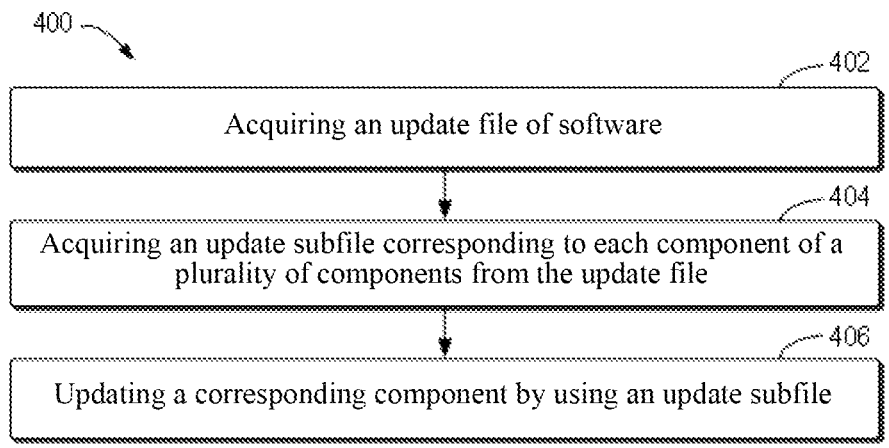
FIG. 4 illustrates a flowchart of a process of updating a plurality of components according to an embodiment of the present disclosure.

Still referring to FIG. 2, in a block 204, the computing device 115 updates the plurality of components. A specific process of the block 204 will be described below in conjunction with FIG. 4. FIG. 4 shows a flowchart of a process 400 of updating a plurality of components according to an embodiment of the present disclosure.

As shown in FIG. 4, in a block 402, the computing device 115 can acquire an update file of the software 105. In some embodiments, the updating of the software 105 can be implemented by acquiring the update file. The computing device 115 can, for example, acquire the update file of the software 105 from a software update server.

In a block 404, the computing device 115 can acquire an update subfile corresponding to each component of the plurality of components from the update file. Since the software 105 includes a plurality of components 110, the update file will also include update subfiles corresponding to the plurality of components 110. In some embodiments, the computing device 115 can acquire update subfiles corresponding to a plurality of deployed components (e.g., the component 110-1, the component 110-2, and the component 110-3) from the update file.

In a block 406, the computing device 115 can update a corresponding component by using an update subfile. For example, in the example of FIG. 1, the component 110-1 is deployed as the deployed component 125-1, the component 110-2 is deployed as the deployed component 125-2, the component 110-3 is deployed as the deployed component 125-M, and the computing device 115 can update the deployed component 125-1, the deployed component 125-2, and the deployed component 125-M by using the update subfile corresponding to the component 110-1, the update subfile corresponding to the component 110-2, and the update subfile corresponding to the component 110-3.

In some embodiments, as shown in FIG. 1, the deployed components 125 can be deployed at identical or different computing nodes 120. The computing device 115 can update a corresponding deployed component 125 by transmitting the update subfile to the corresponding computing node 120.

Still referring to FIG. 2, in a block 206, the computing device 115 periodically acquires a component update progress corresponding to each component of the plurality of components, wherein the component update progress indicates a completion percentage of updating of the corresponding component. In some embodiments, as shown in FIG. 1, each component of the plurality of components (the component 110-1, the component 110-2, and the component 110-3) is deployed to one computing node of a plurality of computing nodes 120 as a deployed component 125.

Figure 5:
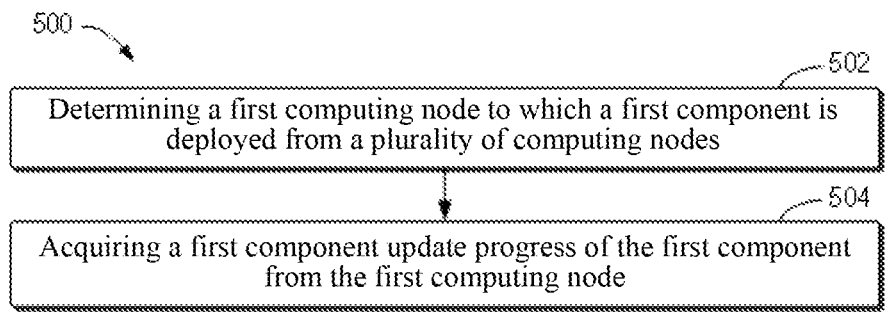
FIG. 5 illustrates a flowchart of a process of determining a component update process according to an embodiment of the present disclosure.

In some embodiments, the computing device 115 can periodically transmit an instruction to the computing node 120 to acquire a component update progress of the deployed components 125 being updated from the computing node 120. In some embodiments, the computing node 120 can also actively and periodically provide the component update progress of the deployed component 125 being updated to the computing device 115. A specific process of the block 206 will be described below in conjunction with FIG. 5. FIG. 5 shows a flowchart of a process 500 of acquiring a component update progress according to an embodiment of the present disclosure.

As shown in FIG. 5, for a first component (e.g., the component 110-1) of a plurality of components (e.g., the component 110-1, the component 110-2, and the component 110-3), in a block 502, the computing device 115 can determine a first computing node to which the first component is deployed from a plurality of computing nodes 120. For example, in the example of FIG. 1, the first component 110-1 is deployed to the computing node 120-1 as a deployed component 125-1. The computing device 115 can determine the computing node 120-1 corresponding to the first component 110-1 based on pre-stored deployment information.

In a block 504, the computing device 115 can acquire a first component update progress of the first component 110-1 from the first computing node 120-1. In some embodiments, the first computing node 120-1 can monitor the component update progress of the first component 110-1 by using a system process, and periodically transmit the component update progress to the computing device 115.

Still referring to FIG. 2, in a block 208, the computing device 115 determines a software update progress of the software based on component update progresses of the plurality of components, wherein the software update progress indicates a completion percentage of updating of the software. In some embodiments, the computing device 115 can determine a corresponding weight for each component, and determine an overall update progress of the software 105 based on the component update progresses.

In some embodiments, the computing device 115 can acquire an expected update time for each component in the component set. For example, the computing device 115 can update all components 110 of the software 105 in a test environment, and determine a time required for updating each component 110 in the software 105 as the expected update time. Additionally, the computing device 115 can determine a weight corresponding to each component 110 of the plurality of components based on the expected update time. For example, the computing device 115 can calculate a ratio of the expected update time for the component 110 to the total time required for updating the software as the weight of the component 110. For example, it takes 30 s to update the component 110-1, and takes 100 s in total to update the software 105. In this case, the weight of the component 110-1 can be determined as 30/100=0.3.

In some embodiments, the computing device 115 can determine a software update progress based on a weighted sum of component update progresses of at least one component. For example, as a further illustration of the example of FIG. 1, the software 105 can include four components: the component 110-1 (with a weight of 0.3), the component 110-2 (with a weight of 0.4), the component 110-3 (with a weight of 0.2), and a component 110-4 (with a weight of 0.1), and the component 110-1, the component 110-2, and the component 110-3 have been deployed and need to be updated. The computing device 115 can acquire the component update progress of each component from each computing node 120. For example, at some point, the update progress of the component 110-1 is 50%, the update progress of the component 110-2 is 30%, and the update progress of the component 110-3 is 60%. In this case, the software update progress can be determined based on the following weighted sum: 0.3*50%+0.4*30%+0.2*60%=39%. That is, the computing device 115 can determine that the overall update progress of the software 105 is 39%.

In this way, in the embodiments of the present disclosure, real-time component update progresses of different components in the software can be acquired, thereby determining a more accurate overall update progress of the software for a user.

In some embodiments, the computing device 115 can present the software update progress by using at least one of the following items: text, graphics, audio, or video. For example, the computing device 115 can present the software update progress in the graphical form of a progress bar.

In some embodiments, the computing device 115 can further present the component update progress corresponding to each component of the plurality of components by using at least one of the following items: text, graphics, audio, or video. For example, the computing device 115 can further present component update progresses corresponding to the plurality of components being updated whilst presenting the total progress bar of the software update progress. In this way, the computing device 115 can allow a user to know about not only the overall software update progress, but also a real-time update progress of each component included in the software.

Figure 6:
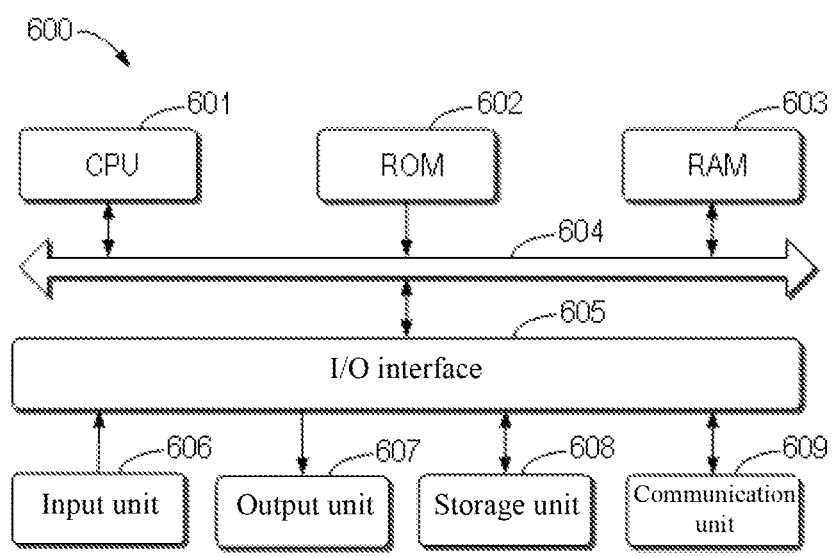
FIG. 6 illustrates a schematic block diagram of an exemplary device that may be configured to implement embodiments of the present disclosure.

FIG. 6 shows a schematic block diagram of an exemplary device 600 that may be configured to implement embodiments of the present disclosure. For example, the computing device 115 according to the embodiments of the present disclosure may be embodied as the device 600. As shown in the figure, the device 600 includes a central processing unit (CPU) 601, which may execute various appropriate actions and processing in accordance with computer program instructions stored in a read-only memory (ROM) 602 or computer program instructions loaded onto a random access memory (RAM) 603 from a storage unit 608. In the RAM 603, various programs and data required for the operation of the device 600 can also be stored. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disk; and a communication unit 609, such as a network card, a modem, and a wireless communication transceiver. The communication unit 609 allows the device 600 to exchange information/data with other devices via a computer network such as the Internet and/or various telecommunication networks.

The processes and processing described above, such as the process 300, the process 400, and/or the process 500, may be executed by the processing unit 601. For example, in some embodiments, the process 300, the process 400, and/or the process 500 may be embodied as a computer software program that is tangibly included in a machine readable medium, such as the storage unit 608. In some embodiments, some or all of the computer program can be loaded and/or installed onto the device 600 via the ROM 602 and/or the communication unit 609. When the computer program is loaded onto the RAM 603 and executed by the CPU 601, one or more actions of the process 300, the process 400, and/or the process 500 described above may be executed.

The present disclosure may be a method, an apparatus, a system, and/or a computer program product. The computer program product may include a computer readable storage medium, which carries computer readable program instructions for executing various aspects of the present disclosure.

The computer readable storage medium may be a tangible device that can keep and store instructions used by an instruction execution device. Examples of the computer readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or in-groove protruding structures with instructions stored thereon, and any suitable combination thereof. The computer readable storage medium used herein is not construed as a transient signal itself, such as a radio wave or other freely propagating electromagnetic waves, an electromagnetic wave propagated through a waveguide or other transmission media (e.g., an optical pulse through an optical cable), or an electrical signal transmitted through a wire.

The computer readable program instructions described herein can be downloaded from a computer readable storage medium to various computing/processing devices, or downloaded to an external computer or external storage device via a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or network interface in each computing/processing device receives computer readable program instructions from the network, and forwards the computer readable program instructions for storage in a computer readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages, such as Smalltalk or C++, and also include conventional procedural programming languages, such as "C" language or similar programming languages. The computer readable program instructions can be executed entirely on a user computer, partly on the user computer, as a stand-alone software package, partly on the user computer and partly on a remote computer, or entirely on the remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer readable program instructions. The computer readable program instructions may be executed by the electronic circuit to implement various aspects of the present disclosure.

Various aspects of the present disclosure are described herein with reference to the flowcharts and/or block diagrams of the method, apparatus (system), and computer program product according to the embodiments of the present disclosure. It should be understood that each block in the flowcharts and/or block diagrams as well as a combination of blocks in the flowcharts and/or block diagrams may be implemented by using the computer readable program instructions.

These computer readable program instructions can be provided to a processing unit of a general purpose computer, a special purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer readable program instructions may also be stored in a computer readable storage medium. These instructions cause the computer, the programmable data processing apparatus, and/or another device to operate in a particular manner, such that the computer readable medium storing the instructions includes a manufactured product, which includes instructions for implementing various aspects of the functions/actions specified in one or more blocks in the flowcharts and/or block diagrams.

The computer readable program instructions may also be loaded onto a computer, another programmable data processing apparatus, or another device, such that a series of operation steps are performed on the computer, another programmable data processing apparatus, or another device to produce a computer implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, method, and computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions noted in the blocks may occur in a sequence different from that shown in the figures. For example, any two blocks presented in succession may be executed substantially in parallel, or they may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of various illustrated embodiments. The selection of terms used herein is intended to best explain the principles and practical applications of the embodiments, or improvements of the technologies on the market, or to enable other persons of ordinary skill in the art to understand the embodiments disclosed herein.

What is claimed is:

1. A method for updating software, comprising:
    determining a plurality of to-be-updated components from a component set comprised in the software;
    updating the plurality of components;
    periodically acquiring a component update progress corresponding to each component of the plurality of components, the component update progress indicating a completion percentage of updating of the corresponding component; and
    determining a software update progress of the software based on component update progresses of the plurality of components, the software update progress indicating a completion percentage of updating of the software;
    wherein determining a software update progress of the software comprises determining the software update progress utilizing a weighted function of the component update progresses of the plurality of components.

2. The method according to claim 1, wherein the determining a plurality of to-be-updated components comprises:
    acquiring deployment information of the component set in the software, the deployment information at least indicating whether each component in the component set is deployed; and
    determining deployed components from the component set based on the deployment information.

3. The method according to claim 1, wherein the updating the plurality of components comprises:
    acquiring an update file of the software;
    acquiring an update subfile corresponding to each component of the plurality of components from the update file; and
    updating a corresponding component using an update subfile.

4. The method according to claim 1, wherein each component of the plurality of components is deployed to one computing node of a plurality of computing nodes, wherein the acquiring a component update progress corresponding to each component of the plurality of components comprises:
    for a first component of the plurality of components:
    determining a first computing node to which the first component is deployed from the plurality of computing nodes; and
    acquiring a first component update progress of the first component from the first computing node.

5. The method according to claim 1, further comprising:
    acquiring an expected update time for each component in the component set; and
    determining a weight corresponding to each component of the plurality of components based on the expected update time;
    wherein resulting weights for respective ones of the plurality of components are utilized in the weighted function;
    wherein the weighted function comprises a weighted sum of the component update progresses of the plurality of components; and
    wherein determining a software update progress of the software comprises determining the software update progress based on the weighted sum.

6. The method according to claim 1, further comprising:
    presenting the software update progress by using at least one of text, graphics, audio, or video.

7. The method according to claim 1, further comprising:
    presenting the component update progress corresponding to each component of the plurality of components by using at least one of text, graphics, audio, or video.

8. A device for storage management, comprising:
    at least one processing unit; and
    at least one memory, the at least one memory being coupled to the at least one processing unit and storing instructions to be executed by the at least one processing unit, the instructions, when executed by the at least one processing unit, causing the device to execute an action, the action comprising:
    determining a plurality of to-be-updated components from a component set comprised in software;
    updating the plurality of components;
    periodically acquiring a component update progress corresponding to each component of the plurality of components, the component update progress indicating a completion percentage of updating of the corresponding component; and
    determining a software update progress of the software based on component update progresses of the plurality of components, the software update progress indicating a completion percentage of updating of the software;
    wherein determining a software update progress of the software comprises determining the software update progress utilizing a weighted function of the component update progresses of the plurality of components.

9. The device according to claim 8, wherein the determining a plurality of to-be-updated components comprises:

acquiring deployment information of the component set in the software, the deployment information at least indicating whether each component in the component set is deployed; and determining deployed components from the component set based on the deployment information.

10. The device according to claim 8, wherein the updating the plurality of components comprises:

acquiring an update file of the software;

acquiring an update subfile corresponding to each component of the plurality of components from the update file; and updating a corresponding component using an update subfile.

11. The device according to claim 8, wherein each component of the plurality of components is deployed to one computing node of a plurality of computing nodes, wherein the acquiring a component update progress corresponding to each component of the plurality of components comprises:

for a first component of the plurality of components:

determining a first computing node to which the first component is deployed from the plurality of computing nodes; and acquiring a first component update progress of the first component from the first computing node.

12. The device according to claim 8, wherein the action further comprises:

acquiring an expected update time for each component in the component set; and determining a weight corresponding to each component of the plurality of components based on the expected update time;

wherein resulting weights for respective ones of the plurality of components are utilized in the weighted function;

wherein the weighted function comprises a weighted sum of the component update progresses of the plurality of components; and wherein determining a software update progress of the software comprises determining the software update progress based on the weighted sum.

13. The device according to claim 8, wherein the action further comprises:

presenting the software update progress by using at least one of text, graphics, audio, or video.

14. The device according to claim 8, wherein the action further comprises:

presenting the component update progress corresponding to each component of the plurality of components by using at least one of text, graphics, audio, or video.

15. A computer program product, the computer program product being stored in a non-transitory computer storage medium and comprising machine executable instructions, the machine executable instructions, when running in a device, causing the device to execute an action, the action comprising:

determining a plurality of to-be-updated components from a component set comprised in software;

updating the plurality of components;

periodically acquiring a component update progress corresponding to each component of the plurality of components, the component update progress indicating a completion percentage of updating of the corresponding component; and determining a software update progress of the software based on component update progresses of the plurality of components, the software update progress indicating a completion percentage of updating of the software;

wherein determining a software update progress of the software comprises determining the software update progress utilizing a weighted function of the component update progresses of the plurality of components.

16. The computer program product according to claim 15, wherein the determining a plurality of to-be-updated components comprises:

acquiring deployment information of the component set in the software, the deployment information at least indicating whether each component in the component set is deployed; and determining deployed components from the component set based on the deployment information.

17. The computer program product according to claim 15, wherein the updating the plurality of components comprises:

acquiring an update file of the software;

acquiring an update subfile corresponding to each component of the plurality of components from the update file; and updating a corresponding component using an update subfile.

18. The computer program product according to claim 15, wherein each component of the plurality of components is deployed to one computing node of a plurality of computing nodes, wherein the acquiring a component update progress corresponding to each component of the plurality of components comprises:

for a first component of the plurality of components:

determining a first computing node to which the first component is deployed from the plurality of computing nodes; and acquiring a first component update progress of the first component from the first computing node.

19. The computer program product according to claim 15, wherein the action further comprises:

acquiring an expected update time for each component in the component set; and determining a weight corresponding to each component of the plurality of components based on the expected update time;

wherein resulting weights for respective ones of the plurality of components are utilized in the weighted function;

wherein the weighted function comprises a weighted sum of the component update progresses of the plurality of components; and wherein determining a software update progress of the software comprises determining the software update progress based on the weighted sum.

20. The computer program product according to claim 15, wherein the action further comprises:

presenting the software update progress by using at least one of text, graphics, audio, or video.

* * * * *